United States Patent Office
3,739,023
Patented June 12, 1973

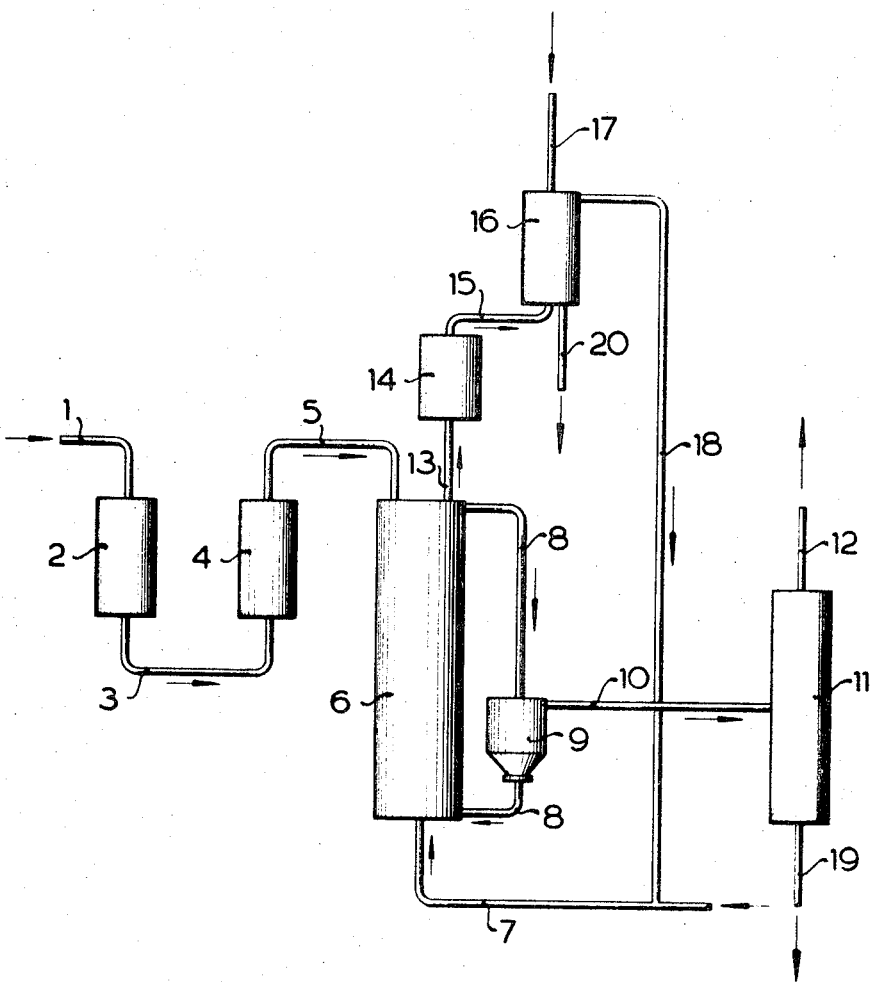

3,739,023
PROCESS FOR THE SELECTIVE CATALYTIC DEHALOGENATION OF HALO ACETIC ACIDS
Kurt Sennewald, Hurth-Hermulheim, Alexander Ohorodnik, Liblar, Werner Mittler, Hurth-Hermulheim, Joachim Hundeck, Knapsack, near Cologne, and Hans-Joachim Hardel, Bruhl-Vochem, Germany, assignors to Knapsack Aktiengesellschaft, Knapsack, near Cologne, Germany
Filed Mar. 23, 1970, Ser. No. 21,697
Claims priority, application Germany, Mar. 25, 1969,
P 19 15 037.9
Int. Cl. C07c 53/16
U.S. Cl. 260—539 A                                3 Claims

ABSTRACT OF THE DISCLOSURE

Selective hydrogenating dehalogenation of halocarboxylic acids, particularly of a crude product which is obtained in the chlorination of acetic acid with the formation of monochloroacetic acid and which in addition to monochloroacetic acid contains di- and optionally trichloroacetic acid as by-product and also acetic acid, by introducing an excess of hydrogen into the liquid crude product, heated to a temperature of 60–170° C., in the presence of a hydrogenation catalyst which is stationary or suspended in the crude product and which consists of an inert carrier and also of a noble metal of Group VIII of the Periodic System, wherein the di- and optionally trihalocarboxylic acid is partially dehalogenated into monohalocarboxylic acid. The noble metal catalyst is more particularly activated by adding at least one metal salt and/or metal oxide which is not a contact poison for the noble metal catalyst and which is at least partially soluble in the feed mixture, and/or adding at least one organic compound which is suitable as a proton acceptor and is at least partially soluble in the starting mixture, the added material being introduced into the starting mixture to be dehalogenated.

---

The object of the present invention is to provide a process for the activation of noble metal catalysts for the selective hydrogenating dehalogenation of halocarboxylic acids by the addition of certain substances which, when added to the reaction mixture even in small amounts, substantially increase the output and life of the noble metal catalyst. The process of the present invention is particularly useful for the purification of commercial monochloroacetic acid.

It is known that the production of monochloroacetic acid by direct chlorination of acetic acid with chlorine gas entails the formation of di- and trichloroacetic acid by-products. These undesirable by-products may either by completely converted by further chlorination into trichloroacetic acid, for which however there is only a limited demand, or may be largely dehalogenated into monochloroacetic acid, for example by one of the processes of German patent specifications No. 1,072,980 or No. 1,201,326 by treatment with hydrogen in the presence of a noble metal catalyst.

The abovementioned German patent specifications No. 1,072,980 and No. 1,201,326 describe processes for the partial dehalogenation of di- and/or trihaloacetic acid by passing a fine liquid or vapour mist of di- and/or trihaloacetic acid or the corresponding solution of these acids, particularly of a mixture produced as by-product in the halogenation of acetic acid to form monohaloacetic acid—the mixture being termed cycle liquid—together with hydrogen, over a stationary hydrogenation catalyst, applied to a carrier, at a temperature of 60–140° C.

In addition, U.S.A. patent specification No. 2,863,917 describes a process for the purification of commercial monoacetic acid by selective dechlorination of the dichloroacetic acid contained as by-product in the monochloroacetic acid, wherein hydrogen gas is introduced into the liquid monochloroacetic acid mixture, heated to a temperature of about 60–170° C. and having a noble metal catalyst applied to a carrier suspended therein, monochloracetic acid being separated from the reaction mixture, following completion of the dechlorination. The useful catalysts include more particularly the noble metals of Group VIII of the Periodic System, preferably palladium.

The catalysts referred to as suitable in U.S.A. patent specification No. 2,863,917 entail the disadvantage that their original activity declines considerably after use for a number of hours. Examples 9 to 17 of this patent show a decrease of contact output after use for 30 hours under the indicated conditions of the process to 60% of the original output, the expression "contact output" meaning the amount of dichloracetic acid converted in grams per hour per gram of noble metal catalyst. In this process the catalyst must therefore be removed from the reaction mixture after use for a relatively short time and reactivated by heating to red heat in an inert atmosphere, which is disadvantageous for continuous dechlorination. The abovementioned U.S.A. Pat. 2,863,917 also reveals that the catalyst described does not have a selective action, since even in the initial phase of the decolorination or dichloroacetic acid only about 15% by weight of the converted dichloroacetic acid is obtained in the form of monochloroacetic acid, while 85% by weight is in the form of acetic acid.

The relatively numerous poisons for noble metal catalysts are well known to constitute a special problem in the field of heterogeneous catalysis. In Advances in Catalysts 3, 129 (1951) E. B. Maxted describes three groups of poisons acting on metal catalysts:

(1) Molecules which contain elements of Groups Vb and VIb of the Periodic System;
(2) A number of certain metals and their compounds;
(3) A plurality of molecules having multiple bonds.

Thus, for example, the second category of catalyst poisons mentioned has been shown by investigations carried out with platinum metal as catalyst to comprise metals or metal ions the external K levels of which are occupied by at least five electrons. Some examples of ions of this type are:

$Cu^+$, $Cu^{2+}$, $Ag^+$, $Au^+$, $Hg^{2+}$, $Pb^{2+}$, $Fe^{2+}$, $Co^{2+}$, and $Ni^{2+}$ Accordingly, the dechlorination of dichloroacetic acid with palladium as catalyst is also completely blocked by the addition of 0.5% by weight of silver acetate to the feed mixture. Copper, lead, and nickel salts in concentrations of 0.5% by weight of the corresponding acetates in each case also impair the activity of palladium catalysts in the above-mentioned activity of palladium catalysts It has however surprisingly been found that the addition of many other metals or metal compounds, and also of salts of ammonium and its derivatives, as well as Lewis bases, has a favourable influence on the partial dehalogenation of halocarboxylic acids in the presence of a noble metal. Compounds containing polar multiple bonds also possess activity in this respect.

The present process for the selective hydrogenating dehalogenation of halocarboxylic acid, particularly of a crude product, obtained in the chlorination of acetic acid with the resultant formation of monochloroacetic acid and containing monochloroacetic acid together with di- and optionally tri-chloroacetic acid by-products and also acetic acid, wherein an excess of hydrogen is introduced into the liquid crude product heated to a temperature of 60-170° C. in the presence of a stationary hydrogenation catalyst or a catalyst suspended in the crude product, the catalyst comprising an inert carrier and a noble metal catalyst of Group VIII of the Periodic System, and wherein the di- and optionally trihalocarboxylic acid is partially dehalogenated into monohalocarboxylic acid and the monohalocarboxylic acid is separated from the hydrogenated mixture, comprises more particularly activating the noble metal catalyst by the addition of at least one metal salt and/or metal oxide which is not a contact poison for the noble metal catalyst and which is at least partially soluble in the feed mixture, and/or of at least one organic compound which is suitable as proton acceptor and is at least partially soluble in the feed mixture, the material added being introduced into the feed mixture to be dehalogenated.

A preferred feature of the present invention comprises adding to the feed mixture a salt and/or oxide of the alkali, alkaline earth, or earth metals or of the rare earths or of a metal of Sub-group 4 or 5 of the Periodic System. The anion of such metal salt may be an acetate, carbonate, chloride, or hydroxide ion.

In those cases in which an organic compound known as a proton acceptor is the activator, it has proved advantageous to use nitrogen bases and their salts, phosphorus-III compounds, ammonium salts, or compounds having a polar multiple bond. Examples of representatives of these groups of compounds are triethylamine, pyridine, 4-aminopyridine, piperidine, glycine, urea, or triphenylphosphine, or salts of these compounds and also butyraldehyde, diisobutyl ketone, butyl acetate, or cyanoacetic acid.

A further feature of the present invention comprises introducing the activation additions into the feed mixture in a minimum amount of about 0.001% by weight, based on the starting mixture, and in a maximum amount which corresponds to the solubility or miscibility of the addition in the feed mixture.

Depending on the use the mixture obtained on completion of the dehalogenation is put to, it may be advantageous for the activation additions to be left in the mixture or else for them to be separated by distillation of the dehalogenation mixture. The activator thus recovered can be re-used.

The present dehalogenation process may be carried out in one or more stages, for example in a group of serial connected reactors. The optimum activator for carrying out the process and also the necessary amount is advantageously determined in the concentration range proposed by the invention in dependence on the particular method of working, the halocarboxylic acid content in the starting mixture, the type, nature, and amount of the noble metal catalyst to be used, the equipment to be used, the proposed residence time for the feed mixture in the reactor, and also the intended use of the reaction product. The effect produced by the use of the activators proposed herein can for example be considerably increased by using a granular carrier material consisting of particles having a size such as that shown in Examples 1 and 5 and in Tables 1 and 7 below. A further advantage of the process of the invention consists in that the original activity of the catalysts used is maintained for a longer period of time while the power of corresponding catalysts without activation addends rapidly declines in the dehalogenation process; this is shown in Examples 2 to 4. In other words, the activators suggested to be used in accordance with the present invention enable the life of conventional noble metal catalysts to be increased by a multiple. Thus the economy of known dehalogenation processes, which is largely dominated by the performance of the noble metal catalyst, is also increased. The addition of activators as suggested by the present invention increases not only the power of freshly produced catalysts but also the power of used catalysts, as can be seen from Examples 6 below.

The process of the invention is particularly useful for the continuous dehalogenation of halocarboxylic acids. The accompanying flow diagram illustrates an exemplary mode of carrying out the present process, applied to the purification of a crude monochloroacetic acid produced in the chlorination of glacial acetic acid in the presence of acetic acid anhydride and acetyl chloride and having dichloroacetic acid and acetic acid therein.

As can be seen, the crude acid is first introduced through pipe 1 into vessel 2 for the saponification of acetic acid anhydride and acetyl chloride therein. Following completion of the saponification the crude acid mixture is passed from saponification vessel 2 through pipe 3 to distillation column 4 in which the crude acid is separated from possible catalyst poisons, such as heavy metal ions. The crude acid pretreated in this manner is then dechlorinated with hydrogen gas in the presence of a fine-particulate catalyst. To this effect, it is introduced through pipe 5 into reactor 6, while the hydrogen flows from below through inlet pipe 7 into the reactor 6. In order to achieve good mixing of the suspension of crude acid and catalyst, the crude acid is recycled from reactor 6 through a pipe 8 connecting the top part of reactor 6 to the bottom. A sedimentation vessel 9 is interposed in pipe 8, the latter having its bottom opening projecting into the tip of sedimentation vessel 9. The recycled suspension passes out of the bottom opening of pipe 8 into the sedimentation vessel 9. The catalyst deposits at the bottom of vessel 9 and is returned together with the bulk of the crude acid into the reactor. A further portion of the dechlorinated crude acid is passed through overflow pipe 10 into distillation column 11 for the separation of acetic acid and monochloroacetic acid therein. The acetic acid is discharged at the top of distillation column 11 through pipe 12, while the monochloroacetic acid accumulates as sump product and is discharged from distillation column 11 through pipe 19. The outgoing gases escaping from reactor 6 through pipe 13, and consisting of excess hydrogen together with hydrogen chloride and small proportions of liquid crude acid entrained by the gas current, are separated from the crude acid components in condenser 14 and then introduced by way of pipe 15 into washing column 16, in which the hydrogen chloride is separated from the outgoing gas by countercurrent washing with water. The latter is fed to washing column 16 through pipe 17. At the top of washing column 16 the purified excess hydrogen is drawn off and returned to reactor 6 through pipes 18 and 7. The washing water is removed from the washing column through pipe 20.

EXAMPLE 1

20 g. of a palladium-silicic acid catalyst having 0.5% by weight of palladium applied to silicon dioxide in the form of spheres about 5 mm. wide, was introduced in a plurality of layers between Raschig rings into a single-cylinder vessel the bottom of which was a frit permeable to gas. 220 g. of distilled commercial monochloroacetic acid containing about 5.4% by weight of dichloroacetic acid were introduced into the vessel and heated to 120° C. in atmosphere of nitrogen. Following this, 50 litres of hydrogen per hour were introduced through the frit into the reaction vessel in the course of 6 hours. Thereupon the residual dichloroacetic acid content in the product separated from the catalyst was determined and the amount of dichloroacetic acid converted and the catalyst output (g. DCE/g. Pd·h.) calculated.

This test was repeated a number of times using fresh catalyst and one of the activators indicated in the table below. The following conversion rates and catalyst output were obtained.

TABLE 1

| Activator | Concentration | | Conversion, percent DCE | Catalyst output g. DCE/g. Pd·h. |
|---|---|---|---|---|
| | Wt. percent | Mol/kg. | | |
| | | | 67.3 | 13.5 |
| Lithium chloride | 0.23 | 0.054 | 77.4 | 15.2 |
| Sodium acetate | 0.23 | 0.017 | 83.6 | 16.8 |
| Sodium chloride | 0.23 | 0.039 | 80.0 | 16.2 |
| Sodium chloroacetate | 0.23 | 0.010 | 78.2 | 15.8 |
| Potassium acetate | 0.23 | 0.023 | 75.5 | 14.7 |
| Potassium chloride | 0.23 | 0.030 | 75.5 | 14.7 |
| Ammonium acetate | 0.23 | 0.030 | 77.4 | 15.2 |
| Ammonium chloride | 0.23 | 0.043 | 82.9 | 16.2 |
| Triethylamine | 0.23 | 0.022 | 81.8 | 16.5 |
| Pyridine | 0.23 | 0.029 | 89.9 | 18.0 |
| Triphenylphosphine | 0.09 | 0.003 | 77.5 | 15.6 |
| Butylacetate | 0.91 | 0.078 | 75.7 | 15.1 |
| Butyraldehyde | 0.91 | 0.126 | 75.7 | 15.1 |
| Diisobutyl ketone | 0.91 | 0.064 | 78.8 | 15.7 |

NOTE.—MCE=Monochloroacetic acid; DCE=Dichloroacetic acid.

EXAMPLE 2

The catalyst was the same as that used in Example 1 save that the carrier consisted of $SiO_2$ extrusions having a diameter of about 4 mm. and a length of 5 to 10 mm. The procedure was similar to Example 1, but the catalyst was brought into contact with fresh commercial monochloroacetic acid after each period of 6 hours, in order to determine its active life. Conversion and catalyst output were also calculated in 6-hour cycles. The data obtained after test times of up to 60 and 120 hours, respectively, are shown in Tables 2 and 3.

TABLE 2

| Activator | Activator concentration | | Wt. percent DCE in starting mixture | Conversion DCE in wt. percent | | | Catalyst output | | |
|---|---|---|---|---|---|---|---|---|---|
| | Wt. percent | Mol/kg. | | 30 hr. | 60 hr. | Mean | 30 hr. | 60 hr. | Mean |
| | | | 6.06 | 19.6 | 8.4 | 12.0 | 4.3 | 1.9 | 2.7 |
| Pyridine | 0.50 | 0.063 | 5.94 | 92.1 | 94.3 | 94.0 | 20.2 | 20.2 | 20.5 |
| Pyridine + $Na_2CO_3$ | 01.+0.067 | | 5.89 | 70.6 | 71.5 | 69.3 | 15.3 | 15.4 | 15.0 |
| 4-aminopyridine | 0.12 | 0.013 | 5.89 | 58.4 | 64.9 | 62.3 | 12.6 | 14.0 | 13.6 |
| Glycocoll | 0.1 | 0.013 | 5.89 | 52.6 | 44.8 | 47.5 | 11.3 | 9.7 | 10.3 |

TABLE 3

| Activator | Activator concentration | | Wt. percent DCE in starting mixture | Conversion DCE in wt. percent | | | | | Catalyst output | | | | |
|---|---|---|---|---|---|---|---|---|---|---|---|---|---|
| | Wt. percent | Mol/kg. | | 30 hr. | 60 hr. | 90 hr. | 120 hr. | Mean | 30 hr. | 60 hr. | 90 hr. | 120 hr. | Mean |
| | | | 5.01 | 13.6 | 10.4 | | | 14.2 | 2.5 | 1.8 | | | 2.6 |
| Sodium carbonate | 0.33 | 0.031 | 5.02 | 76.9 | 66.5 | 66.1 | 70.7 | 14.2 | 12.2 | 12.2 | 13.0 | 13.1 |
| Pyridine hydrochloride | 0.7 | 0.063 | 5.02 | 94.8 | 96.5 | 94.8 | 93.2 | 94.8 | 17.3 | 17.7 | 17.4 | 17.2 | 17.4 |
| Piperidin | 0.54 | 0.063 | 5.02 | 75.3 | 76.9 | 74.3 | 74.7 | 75.3 | 13.8 | 14.2 | 13.6 | 13.6 | 13.8 |

EXAMPLE 3

Three different mixtures were dechlorinated in a manner similar to that described in Example 1, these mixtures being characterised as follows:

A: distilled commercial monochloroacetic acid.
B: monochloroacetic acid purified by repeated recrystallisation from glacial acetic acid and subsequently mixed with a given amount of dichloroacetic acid.
C: as B with the addition of 0.33% by weight of $Na_2CO_3$ as activator.

The conversions and contact outputs obtained in the various experiments are shown in Table 4.

TABLE 4

| Starting mixture | Wt. percent DCE in starting mixture | DCE conversion in wt. percent | | | | | Catalyst output | | | | |
|---|---|---|---|---|---|---|---|---|---|---|---|
| | | 30 hr. | 60 hr. | 90 hr. | 120 hr. | Mean | 30 hr. | 60 hr. | 90 hr. | 120 hr. | Mean |
| A | 6.06 | 19.6 | 8.4 | 5.3 | 6.4 | 8.6 | 4.3 | 1.9 | 1.1 | 1.4 | 1.9 |
| B | 5.94 | 54.9 | 42.3 | 26.1 | 22.7 | 35.1 | 12.0 | 10.2 | 6.3 | 5.5 | 8.0 |
| C | 5.94 | 59.6 | 69.7 | 53.9 | 67.2 | 61.8 | 13.0 | 15.2 | 11.8 | 14.6 | 13.4 |

EXAMPLE 4

The catalyst output of the catalyst described in Example 2, using sodium carbonate or pyridine as activator, was determined in dependence on the concentration of the activator over a test time of a maximum of 60 hours. The test was carried out similarly to the procedure described in Example 2, the reaction mixture being renewed in cycles of 6 hours. The results obtained in respect of dichloroacetic acid conversion and catalyst output are shown in Tables 5 and 6.

TABLE 5

| Activator | Activator concentration | | Wt. percent DCE in starting mixture | Conversion DCE in wt. percent | | | Catalyst output | | |
|---|---|---|---|---|---|---|---|---|---|
| | Wt. percent | Mol/kg. | | 30 hr. | 60 hr. | Mean | 30 hr. | 60 hr. | Mean |
| | | | 5.01 | 13.6 | 10.4 | 14.4 | 2.5 | 1.8 | 2.5 |
| Sodium carbonate | 0.0032 | 0.0003 | 5.22 | 43.5 | 37.4 | 39.1 | 8.3 | 7.1 | 7.5 |
| Do | 0.016 | 0.0015 | 5.03 | 50.7 | 48.1 | 50.7 | 9.3 | 8.8 | 9.4 |
| Do | 0.067 | 0.0063 | 5.03 | 68.6 | 69.2 | 68.4 | 12.6 | 12.6 | 12.6 |
| Do | 0.13 | 0.0125 | 5.22 | 69.4 | 60.0 | 63.3 | 13.3 | 11.5 | 12.1 |
| Do | 0.33 | 0.031 | 5.02 | 76.9 | 66.5 | 76.7 | 14.2 | 12.2 | 14.1 |

TABLE 6

| Activator | Activator concentration | | Wt. percent DCE in starting mixture | Conversion DCE in wt. percent | | | Catalyst output | | |
|---|---|---|---|---|---|---|---|---|---|
| | Wt. percent | Mol/kg. | | 30 hr. | 60 hr. | Mean | 30 hr. | 60 hr. | Mean |
| Pyridine | | | 5.01 | 13.6 | 10.4 | 14.2 | 2.5 | 1.8 | 2.6 |
| Do | 0.005 | 0.0006 | 5.03 | 41.4 | 44.1 | 44.1 | 7.7 | 8.0 | 7.7 |
| Do | 0.025 | 0.003 | 5.03 | 66.2 | 65.3 | 68.8 | 12.5 | 12.0 | 12.7 |
| Do | 0.10 | 0.013 | 5.03 | 78.2 | 75.7 | 78.4 | 14.3 | 14.0 | 14.4 |
| Do | 0.20 | 0.025 | 5.22 | 88.9 | 84.1 | 85.8 | 17.0 | 16.2 | 16.4 |
| | | | 6.06 | 19.6 | 8.4 | 12.0 | 4.3 | 1.9 | 2.7 |
| Do | 0.10 | 0.013 | 5.89 | 76.2 | 77.6 | 76.5 | 16.5 | 16.8 | 16.6 |
| Do | 0.50 | 0.063 | 5.94 | 92.1 | 94.3 | 94.1 | 20.2 | 20.7 | 20.6 |

EXAMPLE 5

With the aid of a suspended catalyst, in which 0.6% by weight of palladium has been deposited on fine particulate silicon dioxide with a particle diameter of 50 to 150μ, 220 g. of distilled commercial monochloroacetic acid with a dichloroacetic acid content of 5.3–5.4 and 7.5% by weight, respectively, were converted as described in Example 1 in the course of 4 hours. The test was repeated with the addition of various activators and the residual dichloroacetic acid content in the resulting samples were determined in each case after a reaction time of 1 and 2 hours. The results of the experiments obtained are shown in Table 7.

TABLE 7

| Activator | Activator concentration | | Wt. percent DCE in starting mixture | Conversion DCE in wt. percent after— | | Catalyst output after— | |
|---|---|---|---|---|---|---|---|
| | Wt. percent | Mol/kg. | | 1 hour | 2 hours | 1 hour | 2 hours |
| | | | 5.35 | 30.4 | 83.1 | 29.0 | 39.1 |
| Sodium acetate | 0.23 | 0.017 | 5.35 | 83.4 | 98.3 | 79.8 | 47.2 |
| Sodium chloroacetate | 0.23 | 0.010 | 5.35 | 39.0 | 81.5 | 37.1 | 39.1 |
| Sodium chloride | 0.23 | 0.039 | 5.35 | 62.4 | 98.3 | 59.6 | 46.4 |
| Ammonium chloride | 0.23 | 0.043 | 5.35 | 59.3 | 92.6 | 57.2 | 44.4 |
| Calcium chloride | 0.23 | 0.020 | 5.35 | 63.1 | 90.8 | 60.5 | 43.5 |
| | | | 7.5 | 30.6 | 69.4 | 41.1 | 46.0 |
| Aluminium chloride | 0.23 | 0.017 | 7.5 | 60.0 | 89.3 | 79.8 | 59.3 |
| Trichlorosilane | 0.23 | 0.017 | 7.5 | 54.7 | 85.3 | 72.6 | 56.8 |
| Cerium dioxide | 0.23 | 0.013 | 7.5 | 60.0 | 89.3 | 79.8 | 59.3 |
| Vanadium pentoxide | 0.23 | 0.013 | 7.5 | 59.8 | 89.5 | 79.5 | 59.4 |
| Titanium dioxide | 0.23 | 0.034 | 7.5 | 62.6 | 89.3 | 83.1 | 59.3 |
| Urea | 0.23 | 0.038 | 7.5 | 70.7 | 97.3 | 94.4 | 64.5 |
| Cyanoacetic acid | 0.23 | 0.027 | 7.5 | 56.0 | 90.7 | 74.2 | 60.9 |

EXAMPLE 6

A used palladium catalyst containing 0.5% by weight of Pd, which had been deposited on silicon dioxide spheres and the power of which had fallen to about 16% of the original power, was used for the purification of commercial monochloroacetic acid having a dichloroacetic acid content of 4.8 to 5.4% by weight under the conditions indicated in Example 1. After addition of 1% by weight of sodium chloroacetate as activator to the crude acid, the catalyst output was approximately doubled, as can be seen from Table 8.

On the addition of 1% by weight of ammonium chloride, the already used catalyst attained more than 60% of its output in the fresh condition, which corresponded to an increase of about 300% compared with the value obtained without activator. In a feed mixture saturated with sodium chloride a similar effect was achieved when the experiment was repeated five times with renewal of the starting mixture each time (see Table 8).

TABLE 8

| Catalyst | Activator | Wt. percent DCE in starting mixture | DCE conversion in wt. percent | Catalyst output |
|---|---|---|---|---|
| Fresh | | 5.4 | 67.3 | 13.5 |
| Used | | 5.1 | 11.7 | 2.2 |
| Do | 1% by wt. of sodium chloroacetate. | 5.4 | 22.7 | 4.5 |
| Do | 1% by wt. of (NH₄)Cl | 5.1 | 42.7 | 8.5 |
| Do | NaCl saturated | 5.1 | 19.6 | 3.7 |
| Do | do | 5.1 | 21.4 | 4.0 |
| Do | do | 5.1 | 37.5 | 7.0 |
| Do | do | 4.8 | 44.3 | 7.8 |
| Do | do | 5.4 | 41.2 | 8.2 |
| Do | do | 5.4 | 44.5 | 8.8 |

EXAMPLE 7

In a tubular reactor suitable for continuous operation and with a stationary catalyst, the latter consisting of silicon dioxide spheres carrying 0.6% by weight of palladium, commercial monochloroacetic acid containing 4.5 to 5.7% by weight of dichloroacetic acid was dechlorinated with the aid of hydrogen at 130 bis 140° C. The commercial monochloroacetic acid trickled over the catalyst, which was placed in a long tube. The conversions and catalyst outputs achieved without the addition of an activator and also in the presence of cyanoacetic acid and urea as activators are shown in Table 9.

TABLE 9

| Activator | Activator concentration | | Wt. percent DCE in starting mixture | DCE conversion in wt. percent | Catalyst output |
|---|---|---|---|---|---|
| | Wt. percent | Mol/kg. | | | |
| | | | 4.9 | 50.0 | 3.25 |
| Cyanoacetic acid | 0.12 | 0.014 | 5.5 | 93.6 | 6.60 |
| Urea | 0.12 | 0.020 | 5.7 | 93.5 | 6.85 |

We claim:

1. In the process for the selective hydrogenation dehalogenation of a crude product obtained in the chlorination of acetic acid with the resultant formation of monochloroacetic acid and containing monochloroacetic acid together with by-products including acetic acid and at least one substance selected from the group consisting of di- and trichloroacetic acid, wherein an excess of hydrogen is introduced into the liquid crude product heated to a temperature of 60–170° C., in the presence of a stationary hydrogenation catalyst or a catalyst suspended in the crude product, the catalyst comprising an inert carrier and a noble metal of Group VIII of the Periodic System; and wherein the di- or trihalocarboxylic acid is partially dehalogenated into monohalocarboxylic acid, and the monohalocarboxylic acid is separated from the hydrogenated mixture, the improvement which comprises activating the noble metal catalyst consisting of palladium metal by introducing into the feed mixture to undergo dehalogenation at least one at least partially soluble substance selected from the group consisting of an alkali metal salt, an ammonium salt, calcium chloride, aluminium chloride, trichlorosilane, cerium dioxide, vanadium pentoxide, titanium dioxide, the bases and the salts of triethylamine, pyridine, 4-aminopyridine, piperidine, glycine, urea, triphenylphosphine, butyraldehyde, diisobutyl ketone, butyl acetate and cyanoacetic acid, the anion of the said metal- and ammonium salts being an acetate, carbonate and chloride ion.

2. The process as claimed in claim 1, wherein the activation additives are introduced into the feed mixture in a minimum proportion of about 0.001% by weight, based on the feed mixture, and in a maximum amount which corresponds to the solubility or miscibility of the added material in the feed mixture.

3. The process as claimed in claim 1, wherein following completion of the dehalogenation step the activation additions are left in the reaction mixture or separated by distilling the monohaloacetic acid mixture, and re-used.

References Cited

UNITED STATES PATENTS

| | | | |
|---|---|---|---|
| 2,863,917 | 12/1958 | Rucker | 260—539 A |
| 3,431,220 | 3/1969 | Batzold | 252—472 |
| 3,463,830 | 8/1969 | Dunning et al. | 252—472 |
| 3,480,531 | 12/1969 | Mulasky | 252—472 |
| 2,688,634 | 9/1954 | Pinkston | 260—539 A |

FOREIGN PATENTS

| | | | |
|---|---|---|---|
| 1,407,526 | 6/1965 | France | 260—497 A |
| 966,809 | 8/1964 | Great Britain | 260—497 A |
| 754,595 | 3/1967 | Canada | 260—497 A |

OTHER REFERENCES

Advances In Catalysis 3, 129 (1951), E. B. Maxted.

LORRAINE A. WEINBURGER, Primary Examiner

J. F. TERAPANE, Assistant Examiner